US011759989B2

(12) United States Patent
Mizunuma et al.

(10) Patent No.: US 11,759,989 B2
(45) Date of Patent: Sep. 19, 2023

(54) OPTICAL SHEET FORMING DEVICE AND OPTICAL SHEET FORMING METHOD

(71) Applicant: SHIBAURA MACHINE CO., LTD., Tokyo (JP)

(72) Inventors: Koji Mizunuma, Tokyo (JP); Yuusuke Uno, Tokyo (JP); Masahiro Tanada, Numazu (JP)

(73) Assignee: Shibaura Machine Co., Ltd., Tokyo (JP)

( * ) Notice: Subject to any disclaimer, the term of this patent is extended or adjusted under 35 U.S.C. 154(b) by 0 days.

(21) Appl. No.: 17/931,325

(22) Filed: Sep. 12, 2022

(65) Prior Publication Data

US 2023/0001620 A1  Jan. 5, 2023

Related U.S. Application Data

(60) Division of application No. 15/818,944, filed on Nov. 21, 2017, now Pat. No. 11,472,086, which is a
(Continued)

(30) Foreign Application Priority Data

Jun. 29, 2015 (JP) .............................. JP2015-130033

(51) Int. Cl.
*B29C 48/08* (2019.01)
*B29C 48/305* (2019.01)
(Continued)

(52) U.S. Cl.
CPC ............ *B29C 48/08* (2019.02); *B29C 43/222* (2013.01); *B29C 43/46* (2013.01);
(Continued)

(58) Field of Classification Search
CPC . B29C 48/0011; B29C 48/0022; B29C 48/08; B29C 48/12; B29C 48/305; B29C 45/13
See application file for complete search history.

(56) References Cited

U.S. PATENT DOCUMENTS 3,849,051 A   11/1974   Solbeck
5,020,984 A    6/1991   Cloeren et al.
(Continued)

FOREIGN PATENT DOCUMENTS

CN     203046095      7/2013
CN     104149249     11/2014
(Continued)

OTHER PUBLICATIONS

International Search Report issued in PCT/JP2016/067565 dated Jul. 26, 2016.
(Continued)

*Primary Examiner* — Nahida Sultana
*Assistant Examiner* — Debjani Roy
(74) *Attorney, Agent, or Firm* — DLA PIPER LLP US

(57) ABSTRACT

An extruding unit, a forming roll unit and a thick portion forming mechanism are provided. The extruding unit has an ejecting slit which ejects sheet-shaped molten resin. The ejecting slit includes a standard gap portion and an enlarged gap portion. The standard gap portion is formed as a gap having a constant size. The enlarged gap portion is formed as a gap larger than the standard gap portion in a position corresponding to a thick portion. The thick portion forming mechanism forms one or several thick portions which are thicker than other portion, in the sheet-shaped molten resin continuously in the extrusion direction.

13 Claims, 6 Drawing Sheets

Related U.S. Application Data continuation of application No. PCT/JP2016/067565, filed on Jun. 13, 2016.

(51) Int. Cl.

| | |
|---|---|
| *B29C 48/91* | (2019.01) |
| *B29C 48/12* | (2019.01) |
| *F21V 8/00* | (2006.01) |
| *B29C 48/88* | (2019.01) |
| *B29C 48/00* | (2019.01) |
| *B29C 43/22* | (2006.01) |
| *B29C 43/46* | (2006.01) |
| *B29C 48/31* | (2019.01) |
| *B29C 59/04* | (2006.01) |
| *G02B 5/02* | (2006.01) |
| *B29C 45/27* | (2006.01) |
| *B29C 43/24* | (2006.01) |
| *B29L 11/00* | (2006.01) |

(52) U.S. Cl.
CPC ...... *B29C 45/2737* (2013.01); *B29C 48/0011* (2019.02); *B29C 48/0022* (2019.02); *B29C 48/12* (2019.02); *B29C 48/305* (2019.02); *B29C 48/313* (2019.02); *B29C 48/91* (2019.02); *B29C 48/914* (2019.02); *B29C 59/04* (2013.01); *G02B 5/02* (2013.01); *G02B 6/0065* (2013.01); *B29C 43/24* (2013.01); *B29C 2043/466* (2013.01); *B29K 2995/0026* (2013.01); *B29L 2011/0075* (2013.01)

(56) References Cited

U.S. PATENT DOCUMENTS

| | | | |
|---|---|---|---|
| 2002/0187309 A1* | 12/2002 | Rost | B29C 44/24 428/172 |
| 2006/0062868 A1 | 3/2006 | Pan et al. | |
| 2008/0088052 A1 | 4/2008 | Takada et al. | |
| 2013/0037987 A1 | 2/2013 | Clarke et al. | |
| 2014/0021644 A1 | 1/2014 | Baab et al. | |
| 2014/0234606 A1 | 8/2014 | Ausen et al. | |
| 2016/0009011 A1 | 1/2016 | He | |
| 2016/0356946 A1 | 12/2016 | Li et al. | |

FOREIGN PATENT DOCUMENTS

| | | |
|---|---|---|
| JP | H04-118213 | 4/1992 |
| JP | 2001-277331 | 10/2001 |
| JP | 2004-082359 | 3/2004 |
| JP | 2006-056214 | 3/2006 |
| JP | 2008-068449 | 3/2008 |
| JP | 2009-040009 | 2/2009 |
| JP | 2009-274388 | 11/2009 |
| JP | 2010-042597 | 2/2010 |
| JP | 2010-050064 | 3/2010 |
| JP | 2010-058437 | 3/2010 |
| JP | 2010-123569 | 6/2010 |
| JP | 2010-221561 | 10/2010 |
| JP | 2014-502568 | 2/2014 |
| JP | 2014-162186 | 9/2014 |
| KR | 10-2008-0103908 | 11/2008 |
| TW | 200714452 | 4/2007 |
| WO | WO 2009-022715 | 2/2009 |
| WO | WO 2015/093227 | 6/2015 |

OTHER PUBLICATIONS

Written Opinion issued in PCT/JP2016/067565 dated Jul. 26, 2016.
Taiwan Office Action issued in Taiwan Application No. 105120193 dated Jul. 25, 2017.
English Language Abstract of JP 2004-082359 published Mar. 18, 2004.
English Language Abstract of JP 2009-274388 published Nov. 26, 2009.
English Language Abstract of JP 2009-040009 published Feb. 26, 2009.
English Language Abstract of JP 2006-056214 published Mar. 2, 2006.
English Language Abstract of JP 2014-502568 published Feb. 3, 2014.
English Language Abstract of TW 200714452 published Apr. 16, 2007.
English Language Abstract of WO 2009-022715 published Feb. 19, 2019.
Korean Office Action in Application No. 10-2017-7035164 dated Apr. 18, 2019.
Chinese Office Action in Application No. 201680033557 dated Apr. 30, 2019.
Japanese Office Action in Application No. 2015-130033 dated May 7, 2019.
Japanese Office Action in Application No. 2019-145436 dated Sep. 15, 2020.
English Language Abstract of JP 2010-058437 published Mar. 18, 2010.

* cited by examiner

OPTICAL SHEET FORMING DEVICE AND OPTICAL SHEET FORMING METHOD

CROSS-REFERENCE TO RELATED APPLICATIONS

This application is a Divisional application of U.S. patent application Ser. No. 15/818,944, filed Nov. 21, 2017, which is a Continuation Application of PCT Application No. PCT/JP2016/067565, filed Jun. 13, 2016 and based upon and claiming the benefit of priority from prior Japanese Patent Application No. 2015-130033, filed Jun. 29, 2015, the entire contents of all of which are incorporated herein by reference.

BACKGROUND OF THE INVENTION

1. Field of the Invention

The present invention relates generally to a technique of extruding an optical sheet used in a light guide panel, etc., for example. In the present invention, a light guide panel is formed as a thickness-reduced sheet (referred to also as a thin sheet) for optical use.

2. Description of the Related Art

For example, in the technical field of mobile devices such as mobile phones and smartphones, along with the thickness reduction of a device main body, the need for the thickness reduction of a backlight unit arises, accordingly. The backlight unit is composed of a light guide panel, a diffuser, a prism sheet, etc., for example. The light guide panel is formed of transparent resin having a high refractive index. To reduce the thickness of the backlight unit, it is essential to form a thickness-reduced light guide panel, i.e., a thin light guide panel. Therefore, to meet the above-described need, a technique of forming an optical thin sheet using resin has been proposed (for example, see Patent Literature 1).

As the thin sheet forming technique, injection molding and extrusion are assumed. In this case, the extrusion technique has higher productive efficiency than the injection molding. Therefore, the thin resin sheet should preferably be formed by the extrusion technique.

CITATION LIST

Patent Literature

Patent Literature 1: JP 2014-502568 A

BRIEF SUMMARY OF THE INVENTION

According to the conventional extrusion technique, in the case of continuously forming a thin sheet having flat front and back surfaces and having a constant thickness (hereinafter referred to as a standard thickness), for example, a technique of continuously forming a thin sheet by thinly spreading molten resin extruded from an extruder into a sheet shape through a flow channel of a T-die and ejecting the sheet-shaped molten resin from the T-die, and then compressing and solidifying the ejected sheet-shaped molten resin by a pair of rolls has been known. In this technique, the flow channel of the T-die has such a configuration that the flow volume of the molten resin is even in the width direction of the T-die when the molten resin is thinly spread into a sheet shape.

Incidentally, the thin sheet continuous forming technique is not exclusively applied to the case of forming a thin sheet having flat front and back surfaces but is also applied to the case of forming a patterned sheet having a recess/projection pattern. In the patterned sheet, recesses and projections are regularly arranged side by side on one or both of the entire front and back surfaces. In this case, a recess/projection pattern corresponding to the reversed recess/projection pattern of the patterned sheet is formed on the surfaces of the pair of rolls. At this time, sheet-shaped molten resin having an even volume in the width direction is ejected from the T-die, similarly to the case of forming a thin sheet having flat front and back surfaces. When the sheet-shaped molten resin contacts the pair of rolls, molten resin overflowing from the projections of the pattern sneaks into the recesses of the pattern, and the volume of resin is balanced, accordingly. Therefore, the average thickness of the formed patterned sheet is the standard thickness.

On the other hand, in the case of forming a thin sheet having flat front and back surfaces and having the standard thickness, as a contour of a preset shape, it is impossible to stereoscopically project (thicken) part of the surface of the thin sheet while maintaining the standard thickness, for example.

In this case, only a recessed groove pattern corresponding to the reversed projection (stereoscopically-projected part of the surface) of the thin sheet is provided on the surfaces of the pair of roll. In other words, a projection corresponding to a recessed groove is not provided on the surfaces of the pair of rolls. Further, sheet-shaped molten resin having an even volume in the width direction is ejected from the T-die, similarly to the case of forming a thin sheet having flat front and back surfaces.

In that case, when the sheet-shaped molten resin contacts the pair of rolls, the molten resin sneaking effect is not sufficient for the molten resin to sneak into the entire recessed groove of the pattern. That is, the volume of resin necessary for the stereoscopic projection (thickening) cannot be supplied. As a result, for example, when the molten resin is solidified, sinks may be developed, and the thin-sheet having a contour of a preset shape may not be accurately formed.

An object of the present invention is to propose an optical sheet forming technique of accurately extruding an optical sheet having a contour of a preset shape.

To achieve this object, the present invention includes an extruding unit, a forming roll unit, and a thick portion forming mechanism. The extruding unit has an ejecting slit configured to eject sheet-shaped molten resin. The ejecting slit has a standard gap portion and an enlarged gap portion. The standard gap portion has a gap of a constant size in a direction crossing an extrusion direction. The enlarged gap portion has a gap larger than the standard gap in a position corresponding to a thick portion. The forming roll unit solidifies and carries the ejected sheet-shaped molten resin in the extrusion direction. The thick portion forming mechanism forms one or a plurality of thick portions which are thicker than the other portion in the sheet-shaped molten resin continuously in the extrusion direction.

According to the present invention, an optical sheet forming technique of accurately extruding an optical sheet having a contour of a preset shape can be realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

One Embodiment

"General description of optical forming device" An optical sheet forming device according to the present embodiment is configured to form a light guide panel. The light guide panel is used as a structure of a backlight unit of a mobile device such as a mobile phone or a smartphone, for example. The light guide panel can be formed of transparent resin having a high reflective index. As the transparent resin, for example, resin such as acrylic resin (PMMA), polycarbonate resin (PC) and cycloolefin resin (COP) can be applied, for example.

Figure 7:
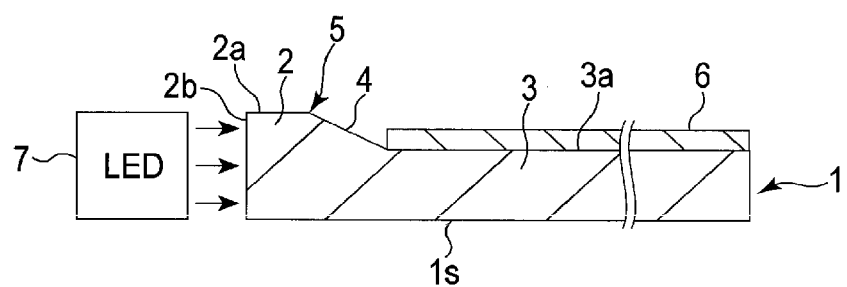
FIG. 7 is a sectional view showing the mode of a finished product as a light guide panel.

As shown in FIG. 7, a thin light guide panel 1 for optical use includes a light entering portion 2 and a surface emitting portion 3. The light entering portion 2 is thicker than the surface emitting portion 3. Here, along with the thickness reduction of the backlight unit, the need for the thickness reduction of the surface emitting portion 3 arises, accordingly. On the other hand, it is technically difficult to reduce the thickness of a light source 7 (for example, an LED) which will be described later to about the thickness of the surface emitting portion 3. Therefore, to take in all the light from the light source 7, it is necessary to increase the thickness of the light entering portion 2 at least to about the thickness of the light source 7 while reducing the thickness of the surface emitting portion 3.

An upper surface 2a of the light entering portion 2 and an upper surface 3a of the surface emitting portion 3 are formed as smooth and flat surfaces. Both of the upper surfaces 2a and 3a are arranged parallel to each other. On the other hand, a lower surface is of the light guide panel 1 is continuously formed from the light entering portion 2 to the surface emitting portion 3. The lower surface is of the light guide panel 1 is formed as a smooth and flat surface. The lower surface is of the light guide panel 1 is opposed parallel to both of the upper surfaces 2a and 3a.

In the light entering portion 2, a smooth and inclined surface 4 is formed between the upper surfaces 2a and 3a. A boundary portion 5 between the inclined surface 4 and the upper surface 2a of the light entering portion 2 is angled. In other words, the boundary portion 5 between the inclined surface 4 and the upper surface 2a of the light entering portion 2 is not rounded. In short, the angle suddenly changes in the boundary portion 5 from the upper surface 2a of the light entering portion 2 toward the inclined surface 4.

The light guide panel 1 is integrally formed from the light entering portion 2 to the surface emitting portion 3. The light entering portion 2 has a light entering surface 2b. The light entering surface 2b stretches in a direction orthogonally crossing the above-described upper surfaces 2a and 3a. The light entering surface 2b has a rectangular shape, for example. The light entering surface 2b faces straight from the light entering portion 2 toward the surface emitting portion 3. A light diffusing component 6 such as a diffuser or a prism sheet is mounted on the upper surface 3a of the surface emitting portion 3.

Here, the light guide panel 1 equipped with the light diffusing component 6 is installed in the mobile device. The light source 7 (for example, an LED) is arranged to be opposed to the light entering surface 2b. In this way, the backlight unit is formed in the mobile device. In this structure, the light emitted from the light source 7 is guided from the light entering surface 2b to the light entering portion 2. All the light guided to the light entering portion 2 is guided along the inclined surface 4 and transmitted to the surface emitting portion 3. The light transmitted to the surface emitting portion 3 is planarly diffused by the light diffusing component 6. As a result, planar and even light can be generated from the surface emitting portion 3.

As shown in FIGS. 1 to 4, an optical sheet forming device 8 is composed of an extruding unit 9, a forming roll unit 10 and a thick portion forming mechanism 11. The extruding unit 9 is configured to eject sheet-shaped molten resin 12m. The forming roll unit 10 is configured to make the ejected sheet-shaped molten resin 12m go through a state where only the surface is solidified (for example, in the case of amorphous resin, the temperature is adjusted to a temperature lower than the glass transition temperature) and then extrude it as an entirely-flexible solid-state optical sheet 12p in an arrow 13 direction. The thick portion forming mechanism 11 is configured to form one or a plurality of thick portions 14b (see FIGS. 5 and 6) which are thicker than the other portion in the molten resin 12m and 12s continuously in the extrusion direction 13.

Here, the extrusion direction 13 represents a direction along a series of extrusion passages continuing from the extruding unit 9 to the forming roll unit 10, for example. The series of extrusion passages represents a series of process paths where the molten resin 12m ejected in the gravity (vertical) direction from the extruding unit 9 is sent forth through the forming roll unit 10.

Further, the optical sheet 12p is thin and excellent in flexibility and can be formed into a roll.

"Forming roll unit 10" The forming roll unit 10 includes a main roll 15, a pushing roll 16, and a feed roll 17. These three rolls 15, 16 and 17 are formed as rolls configured to adjust temperatures thereof, respectively. The three rolls 15, 16 and 17 are maintained at preset constant temperatures, respectively. The preset temperatures represent such temperatures that will not melt but can solidify the molten resin 12m and 12s while maintaining the flexibility of the molten resin 12m and 12s. For example, in the case of polycarbonate resin (PC), the temperatures are set to a temperature of about 140° C.

The main roll 15 has a cylindrical transfer surface 15s. The transfer surface 15s is mirror-finished. The transfer surface 15s is configured to guide the sheet-shaped molten resin 12m ejected from an ejecting slit 18 which will be described later in the extrusion direction 13. The pushing roll 16 has a cylindrical transfer surface 16s. The transfer surface 16s is mirror-finished. The transfer surface 16s is configured to push the molten resin 12m onto the transfer surface 15s of the main roll 15. The feed roll 17 has a cylindrical feed surface 17s. The feed surface 17s is not necessarily mirror-finished. The feed surface 17s is configured to feed the optical sheet 12p in the extrusion direction 13.

The three rolls 15, 16 and 17 are configured to rotate about single rotation axes 15r, 16r and 17r, respectively. The three rotation axes 15r, 16r and 17r are arranged parallel to each other in the horizontal direction. In other words, the three rotation axes 15r, 16r and 17r are arranged in a direction (horizontal direction) crossing (orthogonally crossing) the gravity (vertical) direction. The rotation direction of the main roll 15 is opposite to the rotation direction of the other two rolls 16 and 17.

In this structure, the sheet-shaped molten resin 12m ejected from the extruding unit 9 in the gravity (vertical) direction passes (a contact point) between the main roll 15 and the pushing roll 16. The molten resin 12m having passed the contact point changes to the molten resin 12s where only the surface is solidified while the molten resin 12m is extruded along the transfer surface 15s of the main roll 15. Having passed (the contact point) between the main roll 15 and the feed roll 17, the molten resin 12s changes to the entirely-flexible solid-state optical sheet 12p. In this way, the optical sheet 12p is extruded in the arrow 13 direction. At this time, the thickness is set in the optical sheet 12p as a half-finished product which eventually serves as the thin light guide panel 1.

As one example of the best mode, the drawing shows a mode where the three rolls 15, 16 and 17 are laterally arranged in the horizontal direction.

Alternatively, as a relatively preferable mode, for example, the main roll 15 may be centered and the side rolls (the pushing roll 16 and the reel roll 17) may be obliquely arranged. However, a mode where the three rolls 15, 16 and 17 are vertically arranged in the gravity (vertical) direction is not considered as the best mode.

In the vertical arrangement mode, resin is ejected from the extruding unit 9 to (the contact point) between the main roll 15 and the pushing roll 16. At this time, before reaching (the contact point) between the main roll 15 and the pushing roll 16, the ejected resin is pulled down and hung down by the action of gravity. Therefore, the resin contacts the lower roll (for example, the pushing roll 16) first and begins to solidify at a relatively early stage. As a result, the transfer (forming) accuracy (between the main roll 15 and the pushing roll 16 may not be maintained constant.

"Thick portion forming mechanism 11" The thick portion forming mechanism 11 can be provided in one or both of the main roll 15 and the pushing roll 16. In this case, the thick portion forming mechanism 11 should preferably be provided in the mall roll 15. Therefore, the drawing shows the thick portion forming mechanism 11 provided in the main mall 15 as one example. The thick portion forming mechanism 11 includes a circular thick portion forming groove 19 in the circumferential direction of the main roll 15. The thick portion forming groove 19 is provided on the transfer surface 15s of the main roll 15.

On the transfer surface 15s, the thick portion forming groove 19 is formed further back than the other portion continuously in the circumferential direction. The thick portion forming groove 19 is applied to the case of locally forming a thick portion (thick portion 14b which will be described later) in the above-described half-finished product having a constant thickness (standard thickness). In other words, the thick portion forming groove 19 is provided in a position corresponding to an enlarged gap portion 30 (recessed portion 31) which will be described later (see FIG. 4). The thick portion forming groove 19 and the enlarged gap portion 30 (recessed portion 31) are arranged parallel to each other and are opposed to each other in the extrusion direction 13.

In this structure, in the case of simultaneously forming two half-finished products (thin light guide panels 1), for example, one thick portion forming groove 19 (thick portion forming mechanism 11) may be provided at the width-directional center of the main roll 15. Further, in accordance with the thick portion forming groove 19, one enlarged gap portion 30 (recessed portion 31) may be provided at the width-directional center of the slit 18 which will be described later. On the other hand, in the case of forming one half-finished product (thin light guide panel 1), for example, one thick portion forming groove 19 (thick portion forming mechanism 11) may be provided on one width-directional side of the main roll 15. Further, in accordance with the thick portion forming groove 19, one enlarged gap portion 30 (recessed portion 31) may be provided on one width-directional side of the slit 18 which will be described later.

In this way, one or a plurality of thick portions 14b, which are thicker than the other portion, can be formed in the molten resin 12m and 12s, which has passed between the main roll 15 and the pushing roll 16, continuously in the extrusion direction 13.

"Extruding Unit 9"

The extruding unit 9 includes an extruder 20 and a T-die 21. The extruder 20 and the T-die 21 are connected to each other via a connecting pipe 22. The extruder 20 includes a cylinder (not shown) and a hopper 24. Note that the extruder 20, the connecting pipe 22 and the T-die 21 are heated to a preset temperature and maintained at the preset temperature. The present temperature is higher than the preset temperatures of the above-described three rolls 15, 16 and 17. For example, in the case of polycarbonate resin (PC), the temperature is set to a temperature of about 260° C.

The cylinder is equipped with one or a plurality of rotatably-inserted screws (not shown). Here, a single screw extruder 20 is formed in a mode where one screw is inserted into the cylinder. A twin screw extruder 20 is formed in a mode where a plurality of (for example, two) screws are inserted into the cylinder.

The hopper 24 is configured to inject a resin material into the cylinder. Here, for example, a pellet-like resin material is injected from the hopper 24. The injected resin material is molten and blended by the rotating screw in the cylinder. The molten and blended resin material is carried in a molten state to the distal end of the cylinder. The above-described connecting pipe 22 is provided at the distal end of the cylinder.

The molten resin carried to the distal end of the cylinder is supplied to the T-die 21 through the connecting pipe 22. In other words, the molten resin is generated in the extruder 20. The generated molten resin is supplied to the T-die 21 through the connecting pipe 22. A T-die heating/heat-retention heater 23 (see FIG. 3) is provided in the T-die 21. The T-die 21 is maintained at a preset constant temperature by the heater 23. Therefore, the molten resin supplied to the T-die 21 is not solidified but is maintained in a constant molten state. Since the temperature for maintaining the T-die 21 at the constant temperature is set in accordance with the type or use of the molten resin, numerical limitations are not described in particular here.

The T-die 21 is configured to spread the supplied molten resin into a sheet shape and eject the sheet-shaped molten resin. The T-die 21 includes a manifold 25a communicating with the connecting pipe 22 and a gap passage 25b extending from the manifold 25 (see FIG. 3), for example. The manifold 25a extends in a direction crossing the above-described extrusion direction 13 (that is, the width direction of the slit 18 which will be described later). The gap passage 25b stretches planarly in the width direction of the manifold 25a. One end of the gap passage 25b is connected to the manifold 25a. The other end of the gap passage 25b is connected to the slit 18.

The T-die 21 includes a T-die main body 21a, a fixed lip 21b and a movable lip 21c. The fixed lip 21b and the movable lip 21c can be detachably attached to the T-die main body 21 by fastening bolts 45. In a state where the fixed lip 21b and the movable lip 21c are attached to the T-die main body 21, the above-described manifold 25a and gap passage 25b are formed in the T-die 21.

"Ejecting Slit 18"

The T-die 21 includes the ejecting slit 18 (hereinafter referred to simply as the slit). The slit 18 is configured to eject the sheet-shaped molten resin 12m. The slit 18 has two slit surfaces (a first slit surface 18a and a second slit surface 18b) which are opposed parallel to each other. Here, the slit 18 is defined in a range over the entire length (flow channel length L which will be described later (see FIG. 3)) of the first and second slit surfaces 18a and 18b in the above-described extrusion direction 13. Further, an ejecting port 18c (referred to also as an outlet opening) is provided at the distal end of the slit 18.

More specifically, the ejecting port 18c is provided at the distal end of the T-die 21. The distal end of the T-die 21 represents the lowest portion corresponding to the lowest position in the gravity direction. The ejecting port 18c is formed on the end surface of the lowermost portion (the lower end surfaces of the first and second slit surfaces 18a and 18b). Further, two lips (a first lip 26a and a second lip 26b) are provided at the distal end of the T-die 21. The first lip 26a and the second lip 26b are spaced apart from each other and opposed to each other. The first lip 26a is provided in the above-described movable lip 21c. The second lip 26b is provided in the above-described fixed lip 21b.

The above-described first and second slit surfaces 18a and 18b are provided respectively on the opposed surfaces of the first and second lips 26a and 26b. That is, the first slit surface 18a is provided on the opposed surface of the first lip 26a. The second slit surface 18b is provided on the opposed surface of the second lip 26b. In this way, the above-described slit 18 is formed over a region between the first slit surface 18a and the second slit surface 18b.

In this structure, the above-described ejecting port 18c can be defined as a thin rectangular opening which extends in a direction crossing the above-described extrusion direction 13 (that is, the width direction of the slit 18) along the lower end surfaces of the first and second slit surfaces 18a and 18b. Further, a standard gap portion 29 which will be described later and the enlarged gap portion 30 are formed over the slit 18 continuous with the ejecting port 18c.

The T-die 21 includes a lip gap adjusting mechanism 27 configured to adjust the distance (referred to also as lip gaps h and H) between the two lips 26a and 26b (the first and second slit surfaces 18a and 18b). The lip gap adjusting mechanism 27 includes a plurality of lip adjusting bolts 28. The lip adjusting bolts 28 are rotatably supported to the T-die 21. An adjusting portion 28a is provided at the proximal end of the lip adjusting bolt 28. A pushing portion 28b is provided at the distal end of the lip adjusting bolt 28. The pushing portion 28b is configured to contact one of the two lips 26a and 26b.

The drawing shows the lip adjusting bolt 28 where the pushing portion 28b is brought into contact with the first lip 26a as one example. Here, the adjusting portion 28a is rotated. The pushing portion 28b is advanced. A pushing force is applied from the pushing portion 28b to the first lip 26a. The first lip 26a is elastically deformed. In this way, the first lip 26a is brought closer to the second lip 26b. As a result, the lip gaps h and H can be narrowed.

On the other hand, the adjusting portion 28a is rotated in the opposite direction. The pushing portion 28b is retreated. The pushing force from the pushing portion 28b to the first lip 26a is canceled. The first lip 26a is restored to its original shape by an elastic force. In this way, the first lip 26a is separated further from the second lip 26b. As a result, the lip gaps h and H can be widened.

Further, in the T-die 21, the two slit surfaces 18a and 18b are formed respectively on the opposed surfaces of the first lip 26a and the second lip 26b. That is, the first slit surface 18a is formed on the opposed surface of the first lip 26a. The second slit surface 18b is formed on the opposed surface of the second lip 26b. The standard gap portion 29 and the enlarged gap portion 30 are formed in this slit 18. The standard gap portion 29 and the enlarged gap portion 30 are arranged between the first slit surface 18a and the second slit surface 18b in the slit width direction over the range of the flow channel length L which will be described later. In other words, the standard gap portion 29 and the enlarged gap portion 30 are arranged in a range from the start end to the terminal end of the flow channel length L when viewed in the flow direction of the molten resin. In this case, the start end of the flow channel length L corresponds to the connection portion between the slit 18 and the other end of the above-described gap passage 25b. The terminal end of the flow channel length L corresponds to the ejecting port 18c.

In the standard gap portion 29, the lip gap h (hereinafter referred to as a standard gap h) having a constant size is formed in a direction crossing the above-described extrusion direction 13. The standard gap h is defined as a gap between the first slit surface 18a and the second slit surface 18b. The standard gap h is set based on the thickness of the above-described half-finished product (thin portion 14a which will be described later). Here, assuming the above-described light guide panel 1 (the light entering portion 2 and the surface mission portion 3) as the half-finished product (see FIG. 7), the standard gap h is set based on a thickness t (see FIG. 5) of a portion which eventually serves as the surface emitting portion 3. For example, the standard gap h is set to be about three times or four times the thickness t of the portion eventually serving as the surface emitting portion 3.

In the enlarged gap portion 30, the lip gap H (hereinafter referred to as an enlarged gap H) which is larger than the standard gap h is formed. The enlarged gap portion 30 is provided in the case of forming a thick portion (thick portion 14b which will be described alter) in the above-described half-finished product having a constant thickness (standard thickness). Note that the enlarged gap H can be formed as an enlarged portion of the standard gap h.

In this structure, the number and position of the enlarged gap portion 30 correspond to the number and position of the thick portion 14b. For example, in the case of forming one thick portion 14b at the center of the half-finished product, one enlarged gap portion 30 may be provided at the width-directional center of the slit 18 (first and second slit surfaces 18a and 18b). Further, for example, in the case of forming one thick portion 14b on one side of the half-finished product, one enlarged gap portion 30 may be formed on one width-directional side of the slit 18 (first and second slit surfaces 18a and 18b).

The enlarged gap portion 30 (enlarged gap H) is provided with the recessed portion 31 (referred to also as a groove) in the slit 18 (first and second slit surfaces 18a and 18b). The recessed portion 31 can be formed as a recessed portion of one of the first and second slit surfaces 18a and 18b. The drawing shows the recessed portion 31 formed on the first slit surface 18a of the first lip 26a as one example. In a method of forming the recessed portion 31, part of the first slit surface 18a is formed further back than the other part continuously in the above-described extrusion direction 13. As the recessing method, a method of cutting or trimming part of the first slit surface 18a may be applied, for example.

Figure 5:
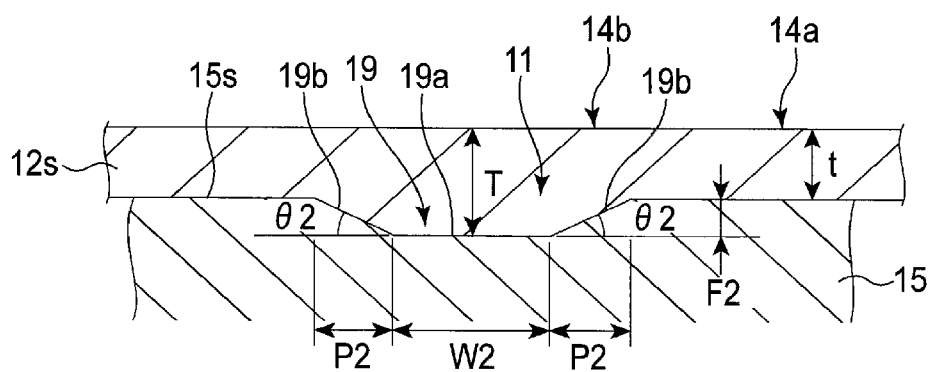
FIG. 5 is a sectional view showing the structure of a main roll and the structure of a half-finished product where a thick portion is formed.
Figure 6:
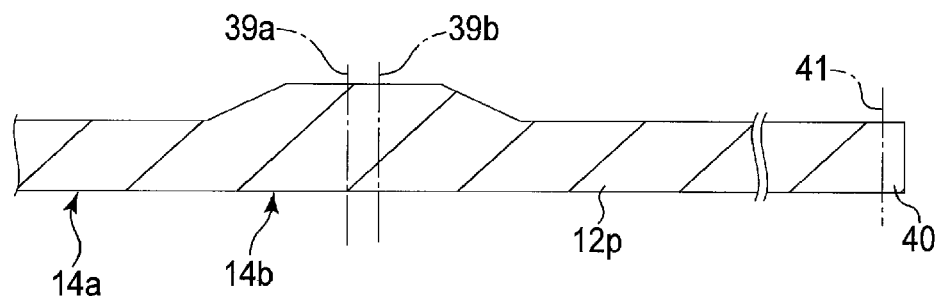
FIG. 6 is a sectional view showing cutting portions of the half-finished product.

The enlarged gap H is defined as a gap between the recessed portion 31 and a portion of the second slit surface 18b which is opposed to the recessed portion 31. The size and shape of the recessed portion 31 are set in accordance with the size and shape of the above-described thick portion forming groove 19 of the main roll 15. FIG. 5 shows the thick portion forming groove 19 having a trapezoidal contour as one example. In this case, the recessed portion 31 may have the size and shape conforming to the trapezoidal contour.

In the recessed portion 31 (see FIG. 4), for example, the width of a recess bottom surface 31a is assumed to be W1, the width of inclined recess surfaces 31b continuously stretching on both sides from the recess bottom surface 31a is assumed to be P1, the inclination angle of the inclined recess surfaces 31b is assumed to be $\theta 1$, and the recess depth of the recessed portion 31 is assumed to be F1. Note that the widths W1 and P1 are defined as the dimensions in a direction crossing (orthogonally crossing) the extrusion direction 13. The inclination angle $\theta 1$ is defined as the angle of the inclined recess surfaces 31b with respect to the width direction. The recess depth F1 is defined as the distance between the first slit surface 18a and the recess bottom surface 31a. From another perspective, the recess depth F1 can be defined as the difference between the enlarged gap H and the standard gap h.

In the thick portion forming groove 19 (see FIG. 5), for example, the width of a groove bottom surface 19a is assumed to be W2, the width of inclined groove surfaces 19b continuously stretching on both sides from the groove bottom surface 19a is assumed to be P2, the inclination angle of the inclined groove surfaces 19b is assumed to be $\theta 2$, and the recess depth of the thick portion forming groove 19 is assumed to be F2. Note that the widths W2 and P2 are defined as the dimensions in a direction crossing (orthogonally crossing) the extrusion direction 13. The inclination angle $\theta 2$ is defined as the angle of the inclined groove surfaces 19b with respect to the width direction. The recess depth F2 is defined as the distance between the transfer surface 15s and the groove bottom surface 19a. From another perspective, the groove depth F2 can be defined as the difference between the thickness T of the light entering portion 2 (thick portion 14b) and the thickness t of the surface emitting portion 3 (thin portion 14a).

In this case, considering the influence of a neck-in phenomenon where the sheet-shaped molten resin 12m ejected from the T-die 21 shrinks in the width direction, such a mode that satisfies relationships expressed as W1≥W2, P1≥P2, $\theta 1 \geq \theta 2$ and F1≥F2, for example, as the relationship between the recessed portion 31 and the thick portion forming groove 19 is assumed. This mode is presented as one example and may be set in accordance with the size of the T-die 21, the type of the resin material, the size, shape, etc., of the half-finished product (thin light guide panel 1), for example. Therefore, numerical limitations of this mode are not described in particular here.

Further, the standard gap h and the enlarged gap H are connected to and communicate with the gap passage 25b. The standard gap h and the enlarged gap H are narrower than the gap passage 25b. In this case, the entire length of the slit 18 (first and second slit surfaces 18a and 18b) in the above-described extrusion direction 13 is defined as the flow channel length L which will be described later (see FIG. 3).

In this structure, the molten resin extruded from the above-described extruder 20 is supplied to the T-die 21 by the extrusion pressure at this moment, and then passes through the slit 18 (the standard gap portion 29 and the enlarged gap portion 30). In this way, the sheet-shaped molten resin 12m is ejected from the ejecting port 18c through the slit 18. In the process of ejection, the molten resin 12m in a position corresponding to the enlarged gap portion 30 is thicker than the other portion of the molten resin 12m.

"Calculation of Enlarged Gap H Based on Pressure Loss"

In the case of forming the light guide panel 1 having the light entering portion 2 and the surface emitting portion 3 (see FIG. 7) as the half-finished product, the enlarged gap H of the slit 18 can be calculated by the following calculation processes. In this case, the light entering portion 2 is formed as the thick portion 14b. The surface emitting portion 3 is formed as the thin portion 14a. The thickness of the light entering portion 2 (thick portion 14b) is assumed to be T, and the thickness of the surface emitting portion 3 (thin portion 14a) is assumed to be t. The standard gap h of the slit 18 is set in advance based on the thickness t of the surface emitting portion 3 (thin portion 14a).

Firstly, when the sheet-shaped molten resin 12m is ejected in the entire length of the slit 18 (first and second slit surfaces 18a and 18b), i.e., in the length L of the parallel and planar flow channel, the relationship between an ejection rate (flow rate) Q and a pressure loss ΔP is expressed as follows.

$$\Delta P = 12 Q \eta L / W s^3 \quad \text{(Equation 1)}$$

If the flow rate per unit width is Q'=Q/W, $$\Delta P = 12 Q' \eta L / s^3 \quad \text{(Equation 2)}$$

$$Q' = t \times V \quad \text{(Equation 3)}$$

$$\Delta P = 12 t \eta L / s^3 \quad \text{(Equation 4)}$$

The pressure loss ΔP of the enlarged gap portion 30 is expressed as follows.

$$\Delta P = 12TV\eta L/H^3 \quad \text{(Equation 5)}$$

The pressure loss ΔP of the standard gap portion 29 is expressed as follows.

$$\Delta P = 12tV\eta L/h^3 \quad \text{(Equation 6)}$$

Here, ΔP is the same in both of the above-described slit portions 29 and 30.

Further, V, η and L are constant. Accordingly, the following equation is established.

$$\Delta P/12V\eta L = t/h^3 = T/H^3 \quad \text{(Equation 7)}$$

Equation 7 is converted into Equation 8. Accordingly, the enlarged gap H of the slit 18 is calculated.

$$H = h \times (T/t)^{1/3} \quad \text{(Equation 8)}$$

Q: Extrusion rate (flow rate) of molten resin
η: Viscosity of molten resin
L: Flow channel length (entire length of slit 18)
W: Width of slit 18
s: Parallel and planar gap
V: Circumferential speed of main roll 15
t: Thickness of surface emitting portion 3 (thick portion 14a) if density is "1"
T: Thickness of light entering portion 2 (thick portion 14b) if density is "1"

Here, numeral values are applied to Equation 8. The thickness T of the light entering portion 2 (thick portion 14b) is assumed to be 0.35 mm, and the thickness t of the surface emitting portion 3 (thin portion 14a) is assumed to be 0.2 mm. The standard gap h of the slit 18 is assumed to be four times the thickness t (=0.2 mm) of the surface emitting portion 3 (thin portion 14a). That is, the standard gap h of the slit 18 is set to 0.8 mm. At that time, the following value (about 1 mm) is obtained as the calculation result of Equation 4.

$$H = 0.8 \times (0.35/0.2)^{1/3}$$
$$= 0.964 \text{ mm}$$
$$\approx 1 \text{ mm}$$

"Allowable Range of Enlarged Gap H"

The enlarged gap H is not exclusively set to the value calculated by above-described Equations (1) to (8). An allowable range is set to the enlarged gap H. As the allowable range, the upper limit and the lower limit may be set with respect to the calculated enlarged gap H, or the upper limit and the lower limit may be set with respect to the difference F1 between the calculated enlarged gap H and the standard gap H of the slit.

For example, as the allowable range with respect to the difference F1, the enlarged gap H may be set to satisfy a relationship expressed as 0.5×(H−h)≤F1≤1.2×(H−h).

For example, in the case of heating the enlarged gap portion 30 and its neighboring region by an enlarged gap portion heater which will be described later, as the allowable range with respect to the difference F1, the enlarged gap H may be set to satisfy a relationship expressed as 0.2×(H−h) F1≤1.0×(H−h). In this case, the heating temperature is set to a temperature several degrees or several tens of degrees higher than a temperature for heat-retention of the T-die 21.

"Other Structures of Extruding Unit 9"
"Enlarged gap portion heater"

Figure 1:
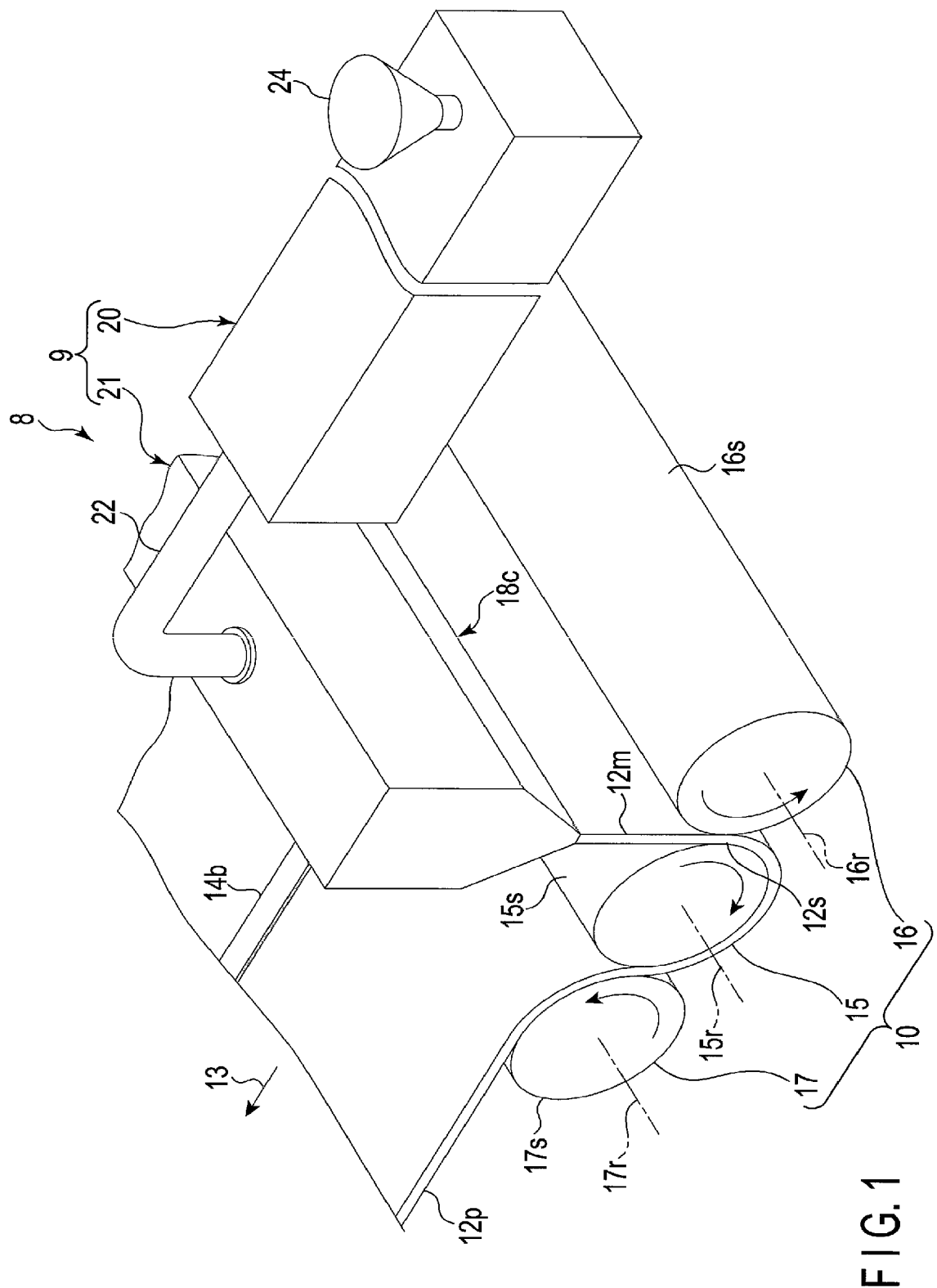
FIG. 1 is a perspective view showing the exterior structure of an optical sheet forming device according to one embodiment.
Figure 2:
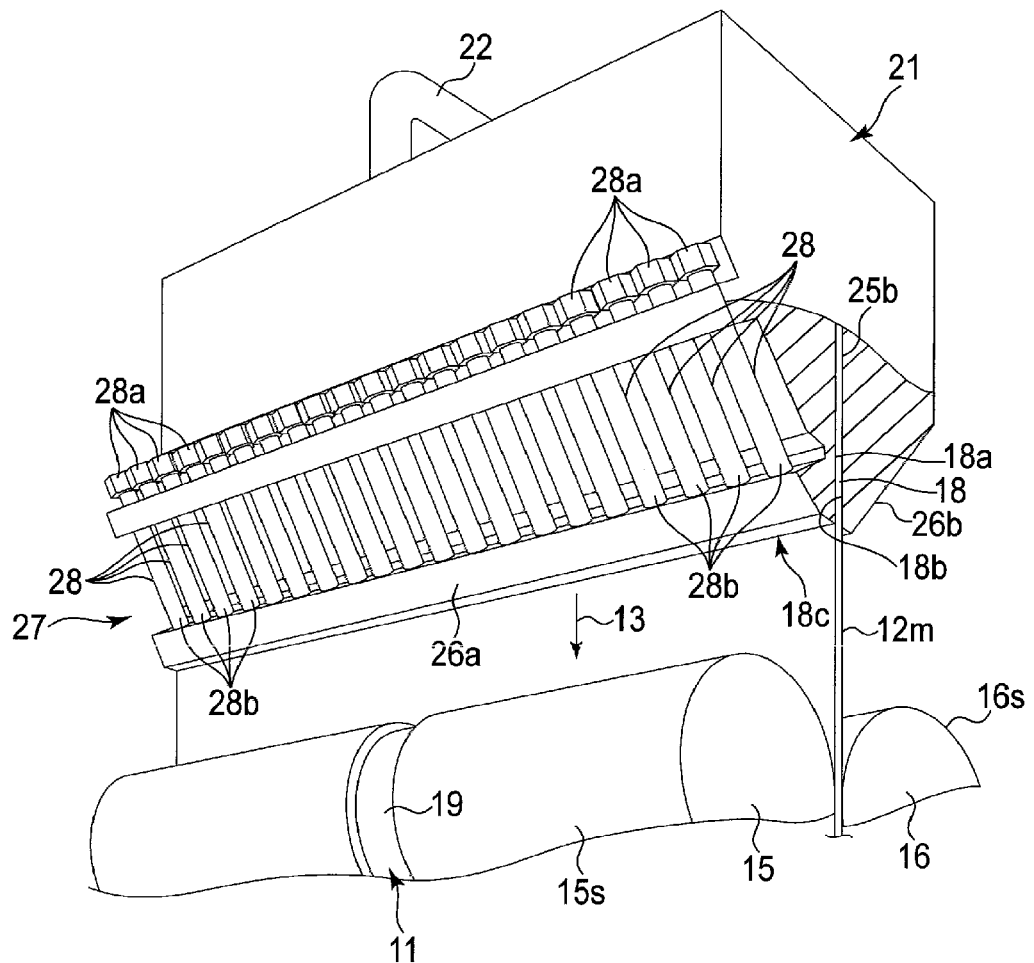
FIG. 2 is a perspective view showing the exterior structure of a T-die.
Figure 3:
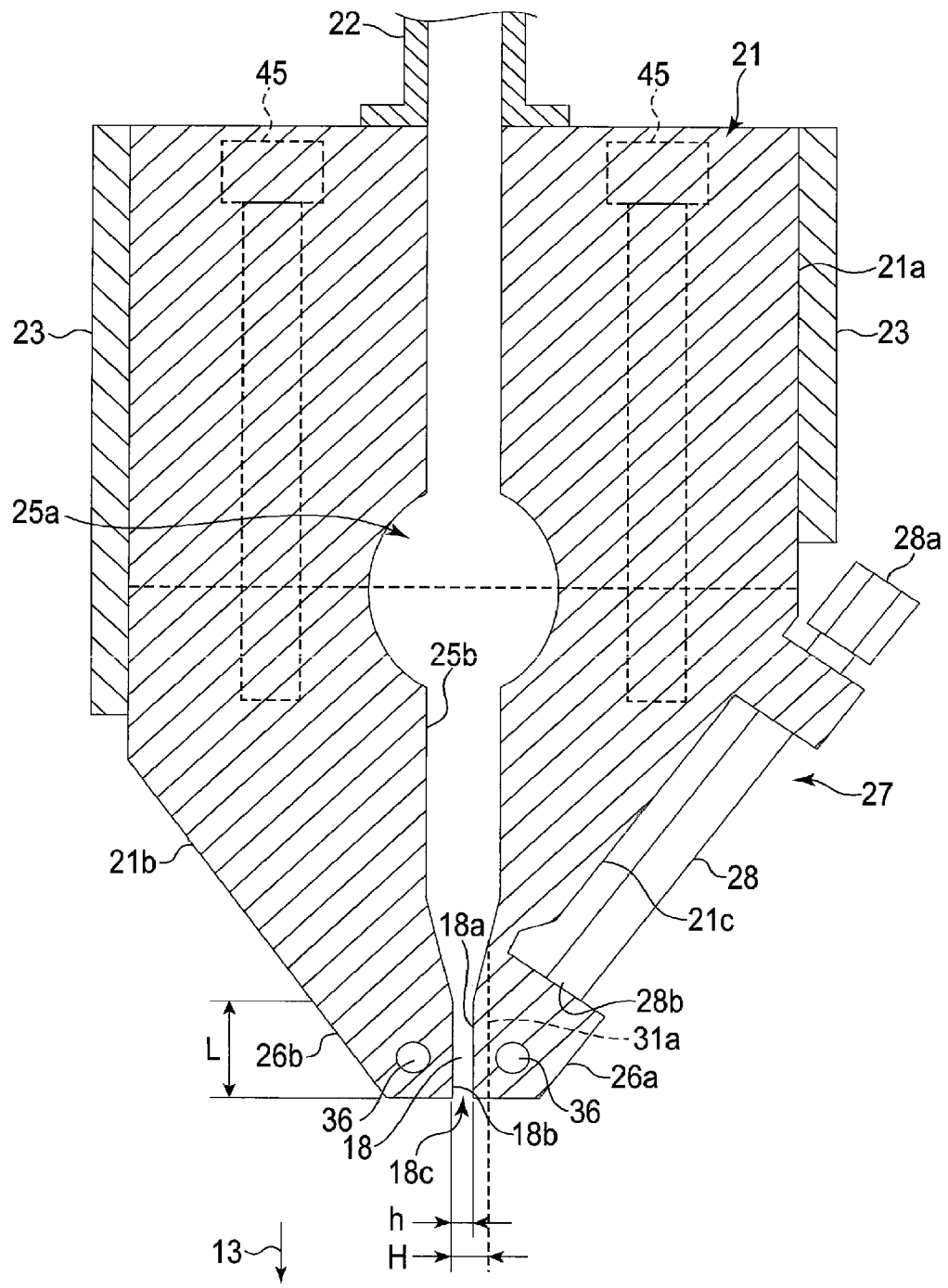
FIG. 3 is a sectional view showing the interior structure of the T-die.
Figure 4:
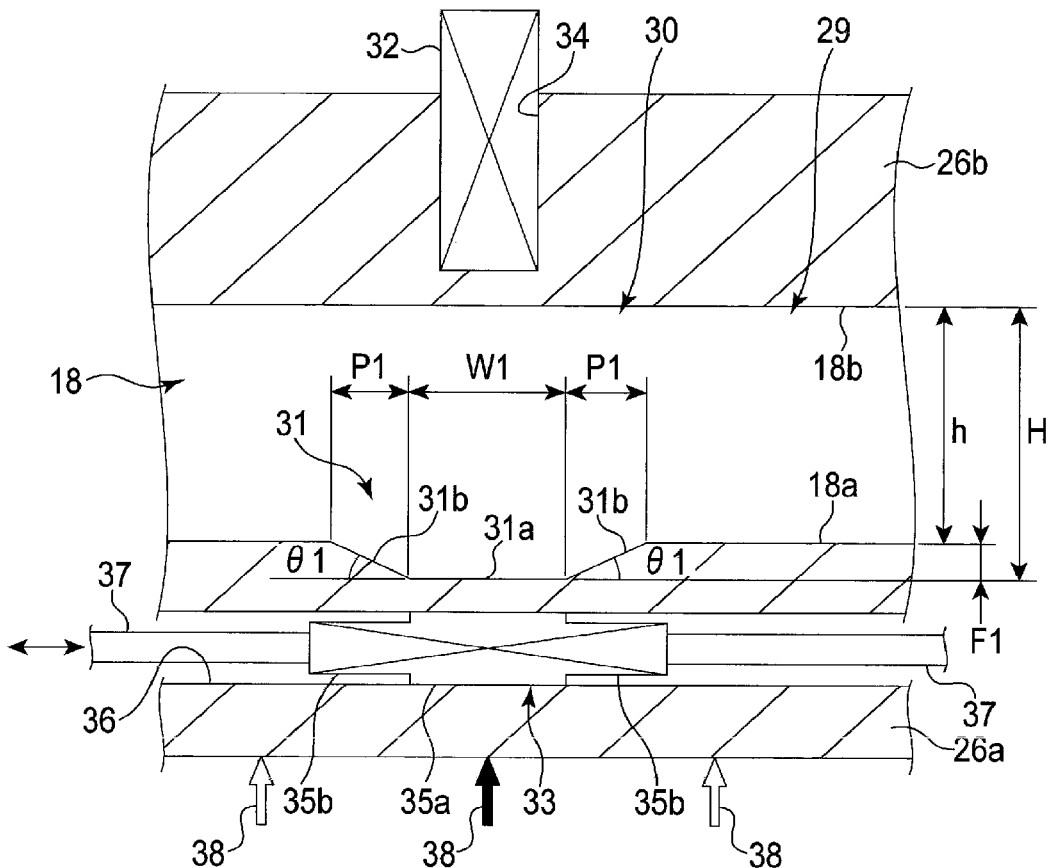
FIG. 4 is a plan view showing the outlet structure of the T-die.

As shown in FIGS. 3 to 4, the T-die 21 includes the enlarged gap portion heater. The heater is configured to heat the enlarged gap portion 30 and its neighboring region. The heater is configured to heat to a temperature several degrees or several tens of degrees higher than the temperature for the heat-retention of the T-die 21. In this structure, the enlarged gap portion 30 and its neighboring region are heated by the heater. In this way, the molten resin passing near this portion is heated. The viscosity of the heated molten resin is reduced, accordingly. As a result, it is possible to facilitate the flow of the molten resin near this portion. As the heater, for example, two types of heaters, i.e., an insertable heater and a position adjustable heater can be applied.

According to the insertable heater, a heat generator 32 can be inserted and fixed to one or both of the two lips (the first lip 26a and the second lip 26b). On the other hand, according to the position adjustable heater, a heat generator 33 can be fixed to one or both of the two lips 26a and 26b in a state of being adjusted to a desired position.

FIG. 3 shows a mode where position adjustable heaters are applied respectively to the two lips 26a and 26b. FIG. 4 shows a mode where one insertable heater and one position adjustable heater are applied respectively to the two lips 26a and 26b. In the mode shown in FIG. 4, the position adjustable heater is applied to the first lip 26a, and the insertable heater is applied to the second lip 26b. In the modes shown in FIGS. 3 and 4, all the heaters are configured to heat the enlarged gap portion 30 and its neighboring region.

As shown in FIG. 4, the insertable heater includes the heat generator 32 and an accommodation hole 34. The accommodation hole 34 is formed as a recessed portion of the second lip 26b. The accommodation hole 34 extends right in front of the enlarged gap portion 30 (recessed portion 31). In this case, the heat generator 32 is inserted into the accommodation hole 34. At this time, the heat generator 32 is positioned oppositely to the enlarged gap portion 30 (recessed portion 31). In this way, the heat generator 32 can be fixed in a state of being inserted into the second lip 26b.

As shown in FIGS. 3 and 4, the position adjustable heater includes the heat generator 33 and a position adjusting mechanism. The heat generator 33 includes a heat generating portion 35a and a heat insulating portion 35b. Both of the heat generating portion 35a and the heat insulating portion 35b generate heat. The diameter (size) of the heat insulating portion 35b is smaller than the diameter (size) of the heat generating portion 35a. In this case, in a state where the heat generator 33 is inserted into a through hole 36 which will be described later, the heat generating portion 35a contacts the inner surface of the through hole 36, while the heat insulating portion 35b does not contact the inner surface of the through hole 36. Therefore, heat travels from the heat generating portion 35a to the T-die 21 but does not travel to the T-die 21 from the heat insulating portion 35b.

This structure is adopted based on the assumption that, for example, when the enlarged gap portion 30 (recessed portion 31) has a small width, the heat generating portion 35a corresponding to the width and capable of exhibiting a sufficient heating capacity cannot be manufactured in some cases. In such a case, the heat generator 33 having the structure where the diameter (size) of the heat insulating portion 35b is smaller than the size (diameter) of the heat generating portion 35a is provided. In this way, only the heat generating portion 35a can be accurately and easily positioned with respect to the heating target (for example, the width region of the enlarged gap portion 30 (recessed portion 31)).

The position adjusting mechanism is configured to adjust the position of the heat generator 33 such that the heat generator 33 is opposed to the enlarged gap portion 30 (recessed portion 31). The position adjusting mechanism includes the through hole 36 and a movement mechanism. The through hole 36 penetrates through the T-die 21 (for example, the first lip 26*a*). The through hole 36 extends in the width direction of the slit 18. The heat generator 33 can be inserted into the through hole 36. Further, the movement mechanism is configured to move the heat generator 33 along the through hole 36. In the drawing, an operation bar 37 extending on both sides of the heat generator 33 is applied as one example of the movement mechanism. One end of the operation bar 37 is connected to the heat insulating portion 35*b*. The other end of the operation bar 37 projects outward from the through hole 36.

According to the position adjustable heater, the heat generator 33 is inserted into the through hole 36 together with the operation bar 37. The operation bar 37 is moved back and forth along the through hole 36. When the heat generator 33 (more specifically, the heat generating portion 35*a*) is opposed to the enlarged gap portion 30 (recessed portion 31), the operation of the operation bar 37 is stopped. At this time, the heat generator 33 (heat generating portion 35*a*) is positioned oppositely to the enlarged gap portion 30 (recessed portion 31). In this way, the heat generator 33 (heat generating portion 35*a*) can be fixed in a state of being adjusted to the position of the first lip 26*a*. In this state, only the heat generating portion 35*a* of the heat generator 33 contacts the first lip 26*a*.

"Arrangement of Lip Adjusting Bolts 28"

In the above-described lip gap adjusting mechanism 27, the lip adjusting bolts 28 are arranged at regular intervals. Among the lip adjusting bolts 28, at least one lip adjusting bolt 28 (pushing portion 28*b*) is positioned at the center of the enlarged gap portion 30 (recessed portion 31). In this case, the center represents a portion in which the enlarged gap portion 30 (recessed portion 31) is divided in half in the width direction of the slit 18. In FIG. 4, a pushing force applied from the pushing portion 28*b* to the first lip 26*a* is shown by an arrow 38. The black arrow 38 represents the pushing force applied from the lip adjusting bolt 28 (pushing portion 28*b*) positioned at the center of the enlarged gap portion 30 (recessed portion 31) to the first lip 26*a*.

According to this arrangement, when the pushing force is applied from the pushing portion 28*b* to the first lip 26*a*, the first lip 26*a* can be evenly elastically deformed. Therefore, the enlarged gap portion 30 (recessed portion 31) will not be unevenly deformed. As a result, the lip gaps h and H can be accurately narrowed to the preset size and shape.

"Optical Sheet Forming Method"

The molten resin is extruded from the extruder 20. The molten resin is supplied to the T-die 21 by the extrusion pressure at this moment (see FIG. 1). The molten resin supplied to the T-die 21 passes through the slit 18 (the standard gap portion 29 and the enlarged gap portion 30). At this time, the sheet-shaped molten resin 12*m* is ejected from the slit 18 (see FIG. 2). In the sheet-shaped molten resin 12*m*, the thickness in the position corresponding to the enlarged gap portion 30 is greater than the thickness of the other portion (see FIG. 5). Note that the enlarged gap portion 30 corresponds to the position of the thick portion forming groove 19 of the main roll 15.

The ejected molten resin 12*m* is compressed while passing (the contact point) between the main roll 15 and the pushing roll 16. At this time, the thick portion 14*b* corresponding to the contour of the shape of the thick portion forming groove 19 is formed in the molten resin 12*m*. The thick portion 14*b* is thicker than the other portion and is continuously formed in the extrusion direction 13 (see FIG. 5). Subsequently, in a cutting process (see FIG. 6), the thick portion 14*b* is cut along two preset cutting lines 39*a* and 39*b*. In this way, two half-finished products which eventually serve as the thin light guide panels 1 are simultaneously formed.

Next, in each half-finished product, a surplus portion 40 formed oppositely on the opposite side to the thick portion 14*b* is cut along a preset cutting line 41, respectively. Note that the drawing shows only one of the cutting lines 41. In this way, the thin light guide panel 1 (FIG. 7) integrally formed from the light entering portion 2 to the surface emitting portion 3 is formed.

Subsequently, in each thin light guide panel 1, the thin portion 14*a* eventually serving as the surface emitting portion 3 is subjected to various surface processes. In this way, the thin light guide panel 1 as the finished product is complete. After that, a light diffusing component 6 (for example, a diffuser, a prism sheet, etc.) is mounted on the upper surface 3*a* of the surface emitting portion 3. As a result, the backlight unit of the mobile device (see FIG. 7) is complete.

In the various surface processes to the thin portion 14*a* eventually serving as the surface emitting portion 3, for example, the surface process for forming a recess/projection pattern may be set to be simultaneously performed when the contour of the shape of the molten resin 12*m* and 12*s* is formed by the above-described forming roll unit 10.

Effects of Embodiment

According to the present embodiment, the enlarged gap portion 30 and the thick portion forming mechanism 19 are arranged in accordance with the contour of the shape of the thin light guide panel 1 as the half-finished product. The enlarged gap portion 30 can be formed as an enlarged portion of the standard gap h of the slit 18. The thick portion forming mechanism 19 is formed as a recessed portion on the transfer surface 15*s* of the main roll 15 in a position corresponding to the enlarged gap portion 30 continuously in the circumferential direction. In the molten resin 12*m* ejected from the slit 18, the thickness of the position corresponding to the enlarged gap portion 30 is greater than the thickness of the other portion. Further, as the molten resin 12*m* passes through the thick portion forming mechanism 19, the contour of the shape of the thick portion 14*b* of the half-finished product (the light entering portion 2 of the light guide panel 1) is accurately formed. In this way, the optical sheet used in the half-finished product (the thin light guide panel 1) can be accurately extruded in conformity with the contour of the preset shape.

According to the present embodiment, in the contour of the shape of the half-finished product (the thin light guide panel 1), the upper surface 2*a* of the light entering portion 2 can be formed as a flat surface without recesses or projections. In this way, all the light emitted from the light source 7 (for example, an LED) can be taken in from the light entering surface 2*b* and smoothly guided into the light entering portion 2. As a result, the half-finished product (thin light guide panel 1) having excellent light guiding efficiency can be realized.

According to the present embodiment, the boundary portion 5 between the inclined surface 4 and the upper surface 2a of the light entering portion 2 can be angled in the contour of the shape of the half finished product (thin light guide panel 1). In other words, the boundary portion 5 between the inclined surface 4 and the upper surface 2a of the light entering portion 2 can be formed without roundness. In short, the angle can be suddenly changed from the upper surface 2a of the light entering portion 2 toward the inclined surface 4 in the boundary portion 5. In this way, all the light guided into the light entering portion 2 can be transmitted to the surface emitting portion 3 along the inclined surface 4. As a result, planar and even light can be produced from the surface emitting portion 3.

According to the present embodiment, the fixed lip 21b and the movable lip 21c can be detachably attached to the T-die main body 21 by the fastening bolts 45. That is, the fixed lip 21b and the movable lip 21c can be replaceably attached to the T-die main body 21. Therefore, if the above-described enlarged gap portion 30 (recessed portion 31) is provided in the movable lip 21c, for example, it is possible to form an optical sheet (half-finished product eventually serving as a thin light guide panel) of another mode having a different shape and a different size simply by replacing the movable lip 21c.

"Demonstration Experiment of Effects of Embodiment"

The T-die 21 having the recessed portion (groove) 31 in the slit 18 (for example, on the first slit surface 18a of the first lip 26a), and the T-die 21 having no recessed portion (groove) are prepared. In other words, the T-die 21 according to a conventional product where "a lip has no groove" and the T-die 21 according to the present invention where "a lip has a groove" are prepared. Further, a common experiment device (that is, the optical sheet forming device 8) is prepared for both T-dies 21.

The specifications of the experiment device are as follows.

Figure 9:
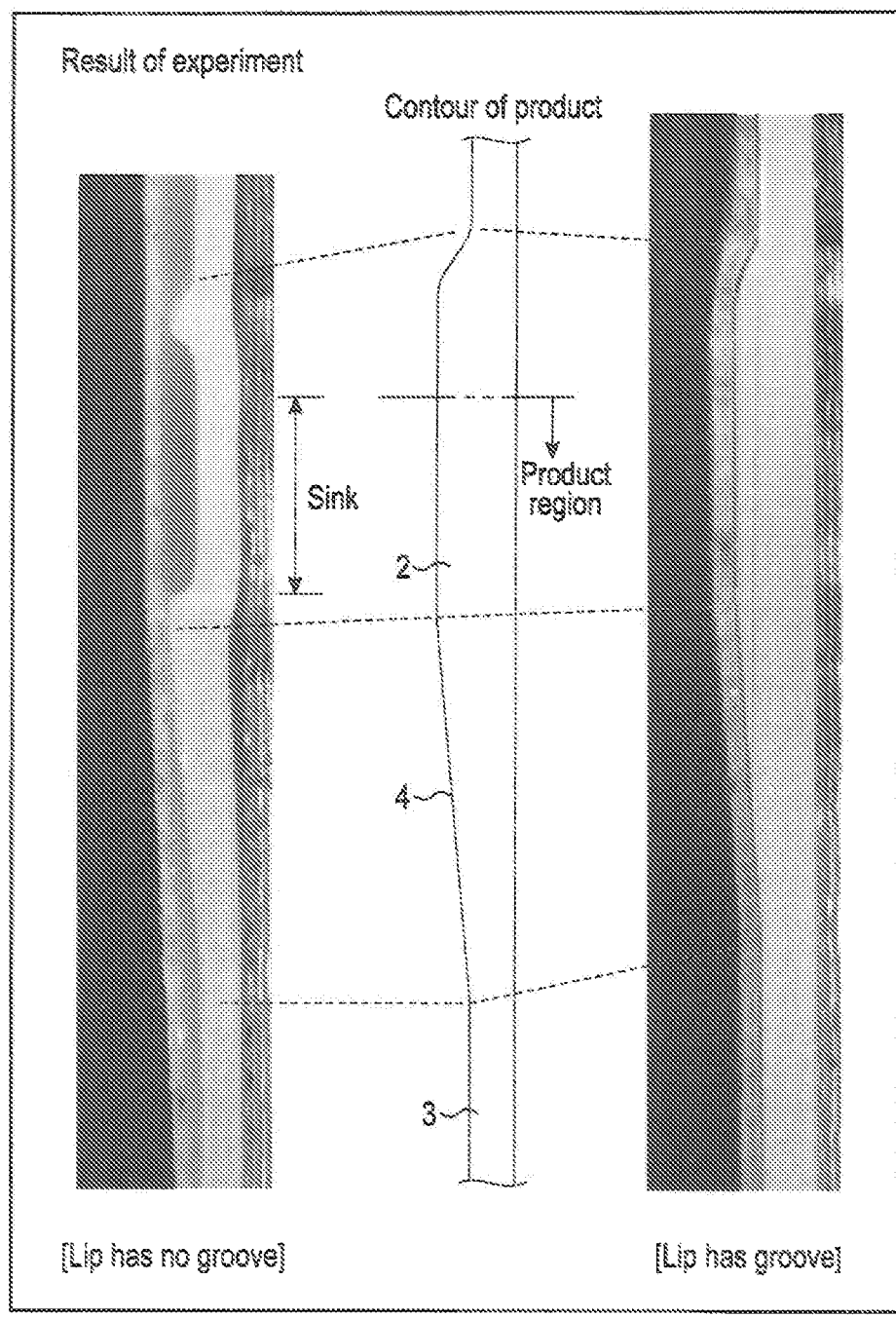
FIG. 9 is a sectional view showing a result of comparison between a half-finished product in a case where a lip has a groove and a half-finished product in a case where a lip has no groove.

Extruder: Co-rotating twin-screw compounder, Screw Nominal diameter 28 mm
  T-die: Width 330 mm, Lip gap 0.8 mm
  Three rolls: Diameter 180 mm, Surface length 400 mm
  Main roll: Groove of depth of 0.15 mm at center
  Extrusion rate (flow rate) of molten resin: 20 kg/h of polycarbonate material
  Thickness of finished product (light guide panel): Thickness of thick portion (light entering portion) 0.35 mm, Thickness of thin portion (surface emitting portion) 0.2 mm FIG. 9 shows a result of the experiment. That is, a photographic image of a cross-section of a half-finished product in the case of using the T-die 21 where "a lip has no groove", and a photographic image of a cross-section of a half-finished product in the case of using the T-die 21 where "a lip has a groove" are shown. A contour of an optimal product is shown between the photographic images of the cross-sections. According to the result of the experiment, in a product region having a contour of a product, a sink occurs in the half-finished product in a case where "a lip has no groove", while no sink occurs in the half-finished product in a case where "a lip has a groove". This result proves that the above-described effect can be produced by the T-die 21 where "a lip has a groove" according to the present invention.

Modification

Figure 8:
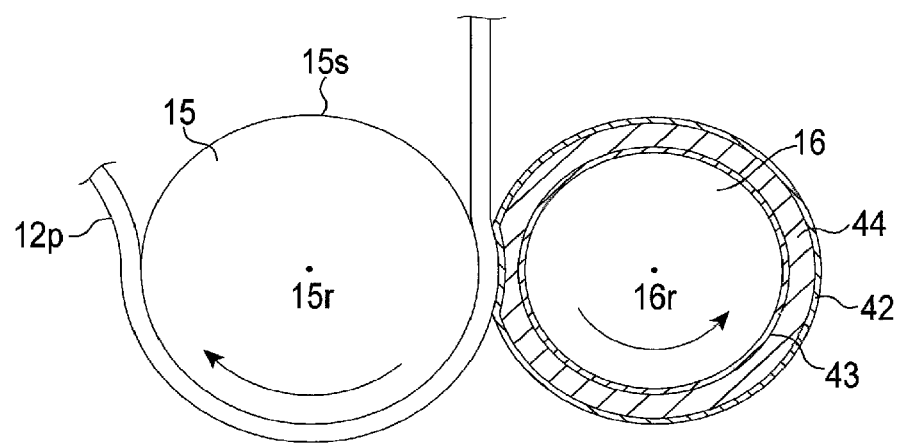
FIG. 8 is a sectional view showing the structure of a pushing roll according to a modification.

In the above-described embodiment, the pushing roll 16 of the forming roll unit 10 is assumed to be of a mode where the outer circumference does not elastically deform, but alternatively a pushing roll 16 having an elastically deformable outer circumference may be applied. As shown in FIG. 8, the pushing roll 16 of the present modification includes an outer cylinder 42, an inner cylinder 43 and a temperature adjusting medium 44. The outer cylinder 42 is arranged on the outside of the inner cylinder 43. The temperature adjusting medium 44 fills between the outer cylinder 42 and the inner cylinder 43 without any space. The outer cylinder 42 and the inner cylinder 43 are concentrically arranged with respect to the rotation axis 16r of the pushing roll 16.

The inner cylinder 43 has rigidity. The inner cylinder 43 is less likely to be elastically deformed. The inner cylinder 43 is formed of a metal material. On the other hand, the outer cylinder 42 has elasticity. The outer cylinder 42 is elastically deformable. The outer cylinder 42 is formed of a metal material. In this case, the outer cylinder 42 is thinner than the inner cylinder 43. By reducing the thickness of the outer cylinder 42, the outer cylinder 42 becomes more likely to be elastically deformed.

According to this structure, when the sheet-shaped molten resin 12m ejected from the slit 18 of the T-die 21 is pushed onto the transfer surface 15s of the main roll 15, the outer cylinder 42 elastically deforms along the transfer surface 15s. In this way, the molten resin 12m can be attached firmly along the thick portion forming groove 19 of the main roll 15 without any space. As a result, the molten resin 12m can be pushed evenly in the width direction of the transfer surface 15s of the main roll 15.

In this case, a portion of the outer cylinder 42 which contacts the molten resin 12m should preferably be mirror-finished. In this way, the lower surface is of the half-finished product (thin light guide panel 1) can be formed as a smooth and flat surface. The lower surface is of the half-finished product (thin light guide panel 1) can be opposed parallel to the upper surface 2a of the light entering portion 2 and the upper surface 3a of the surface emitting portion 3. As a result, the optical properties of the thin light guide panel 1 as the half-finished product can be maintained constant. Note that the other structures and effects are the same as those of the above-described embodiment and are not described in detail here.

Further, in the above-described embodiment, part (for example, the central portion) of the cylindrical groove bottom surface 19a of the thick portion forming mechanism 11 (thick portion forming groove 19) may be continuously projected in the circumferential direction. In this case, as the cross-sectional shape of the projected portion, various shapes such as a rectangle, a circular arc and a rectangle can be applied. Further, the projection amount (thickness) should preferably be set to such a range where the projection amount (thickness) does not exceed the thickness T of the thick portion 14b of the half-finished product (thin light guide panel 1).

According to this structure, the thickness of the thick portion 14b can be reduced only in the projected portion. In this way, it is possible to facilitate the cutting and reduce the cutting time in the optical sheet forming method. Note that the other structures and effects are the same as those of the above-described embodiment and are not described in detail here.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

REFERENCE SIGNS LIST

1 . . . Thin light guide panel, 8 . . . Optical sheet forming device, 9 . . . Extruding unit, 10 . . . Forming roll unit, 11 . . . Thick portion forming mechanism, 18 . . . Ejecting slit, 29 . . . Standard gap portion, 30 . . . Enlarged gap portion.

What is claimed is:

1. An optical sheet forming method comprising:
    spreading, by an extruding unit including an ejecting slit and configured to eject sheet-shaped molten resin, molten resin into a sheet shape;
    ejecting, by the extruding unit, the sheet-shaped molten resin;
    extruding, by the extruding unit, the ejected molten resin in the extrusion direction; solidifying and carrying, by a forming roll unit, the ejected molten resin from the extruding unit in the extrusion direction and
    forming, by a thick portion forming mechanism, one or a plurality of thick portions which are thicker than other portions in the sheet-shaped molten resin in a the process of extruding the molten resin continuously in the extrusion direction, wherein a thickness of a portion corresponding to the thick portion is greater than a thickness of the other portions in the ejected sheet-shaped ejected molten resin ejected, wherein:
    the ejecting slit comprises a standard gap portion where a gap having a constant size is formed in a direction crossing the extrusion direction, and
    the ejecting slit comprises an enlarged gap portion where a gap larger than the standard gap is formed in a position corresponding to the thick portion forming mechanism.

2. The optical sheet forming method of claim 1, further comprising:
    cutting the thick portion along the thick portion; and
    cutting a surplus portion formed oppositely on an opposite side to the thick portion.

3. The optical sheet forming method of claim 1, wherein the extruding unit comprises an extruder configured to generate the molten resin and extrude the generated molten resin by a preset extrusion pressure, and a die configured to spread the extruded molten resin into a sheet shape and eject the sheet-shaped molten resin, wherein the ejecting slit is provided in the die, and
    the molten resin extruded from the extruder is supplied to the die by the extrusion pressure and is spread into a sheet shape through the ejecting slit, and a thickness of a position corresponding to the enlarged gap portion is greater than a thickness of other portion, in the sheet-shaped molten resin.

4. The optical sheet forming method of claim 3, wherein: the ejecting slit in the die has two slit surfaces opposed parallel to each other,
    the gap of the standard gap portion is formed between the two slit surfaces,
    one of the two slit surfaces includes a recessed portion which is formed further back than another portion, and
    the gap of the enlarged gap portion is formed between the recessed portion and a portion of the other of the two slit surfaces which is opposed to the recessed portion.

5. The optical sheet forming method of claim 3, further comprising heating, by a heater, the enlarged gap portion and a neighboring region thereof.

6. The optical sheet forming method of claim 5, further comprising positioning, by a position adjusting mechanism, the heater such that the heater is opposed to the enlarged gap portion.

7. The optical sheet forming method of claim 6, wherein:
    the position adjusting mechanism comprises a through hole penetrating and extending through the die along the ejecting slit and configured such that the heater is insertable into the through hole, and a movement mechanism configured to move the heater along the through hole, and
    the heater is moved along the through hole by the movement mechanism and is positioned such that the heater is opposed to the enlarged gap portion.

8. The optical sheet forming method of claim 1, wherein in the ejecting slit, when the gap of the standard gap portion is h and the gap of the enlarged gap portion is H, a difference F1 between H and h satisfies a relationship expressed as $0.5 \times (H-h) \leq F1 \leq 1.2 \times (H-h)$.

9. The optical sheet forming method of claim 1, wherein in the ejecting slit, when the enlarged gap portion and a neighboring region thereof are heated, and when the gap of the standard gap portion is h and the gap of the enlarged gap portion is H, a difference F1 between H and h satisfies a relationship expressed as $0.2 \times (H-h) \leq F1 \leq 1.0 \times (H-h)$.

10. The optical sheet forming method of claim 1, wherein in the molten resin where the thick portion is formed, when the thickness of the thick portion is T and a thickness of the other portion is t, a relationship expressed as $H = h \times (T/t)^{1/3}$ is satisfied.

11. The optical sheet forming method of claim 1, wherein:
    the forming roll unit comprises a main roll including a transfer surface and configured to guide the molten resin in the extrusion direction and a pushing roll configured to push the molten resin extruded from the ejecting slit onto the transfer surface of the main roll,
    the thick portion forming mechanism is provided on the transfer surface of the main roll, and
    the transfer surface includes a circular thick portion groove which is formed further back than other surface in a position corresponding to the enlarged gap portion continuously in a circumferential direction.

12. The optical sheet forming method of claim 11, wherein:
    the pushing roll comprises an outer cylinder which is formed of metal and is elastically deformable, and
    the outer cylinder elastically deforms along the transfer surface when the molten rein is pushed onto the transfer surface of the main roll.

13. The optical sheet forming method of claim 12, wherein a portion of the outer cylinder which contacts the molten resin is mirror-finished.

* * * * *